United States Patent [19]

McMullen

[11] 4,021,943
[45] May 10, 1977

[54] PRESSING IRON WATER LEVEL GAUGE

[75] Inventor: Alan R. McMullen, North Canton, Ohio

[73] Assignee: The Hoover Company, North Canton, Ohio

[22] Filed: Feb. 23, 1976

[21] Appl. No.: 660,235

[52] U.S. Cl. .............. 38/77.2; 73/290 R; 73/327; 116/118 R
[51] Int. Cl.² .............. G01F 23/02; D06F 75/00
[58] Field of Search ........ 73/327, 334, 323, 290 R; 116/118 R; 38/77.2

[56] References Cited

UNITED STATES PATENTS

| 2,190,904 | 2/1940 | Wiggins | 38/77.2 |
| 2,311,387 | 2/1943 | Hastings | 116/118 R |
| 2,468,284 | 4/1949 | Balken | 116/118 R |
| 3,075,309 | 1/1963 | Seyfried et al. | 38/77.2 |
| 3,273,267 | 9/1966 | Willman | 73/327 |
| 3,424,004 | 1/1969 | Rapata | 73/327 |

FOREIGN PATENTS OR APPLICATIONS 2,005,612 9/1970 Germany ............ 38/77.2

Primary Examiner—James J. Gill
Assistant Examiner—Anthony V. Ciarlante

[57] ABSTRACT

In the preferred form, the present invention is directed to a water gauge which indicates the amount of water in the reservoir of a pressing iron. The gauge is so positioned with respect to the reservoir and the contents thereof that the indication function is provided both when the iron is in a horizontal or ironing position and when the iron is in the vertical or heel rest position.

3 Claims, 5 Drawing Figures

U.S. Patent    May 10, 1977    4,021,943
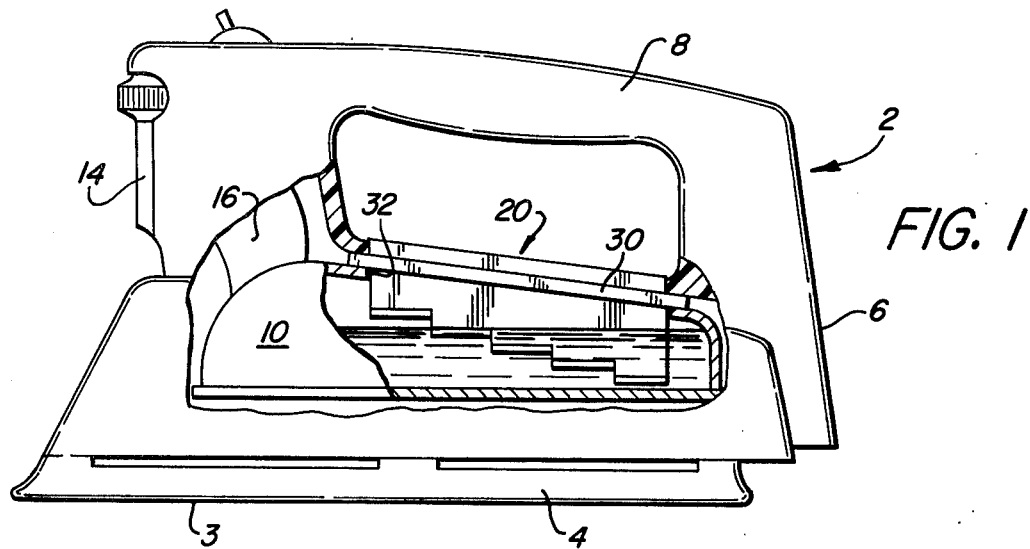
FIG. 1
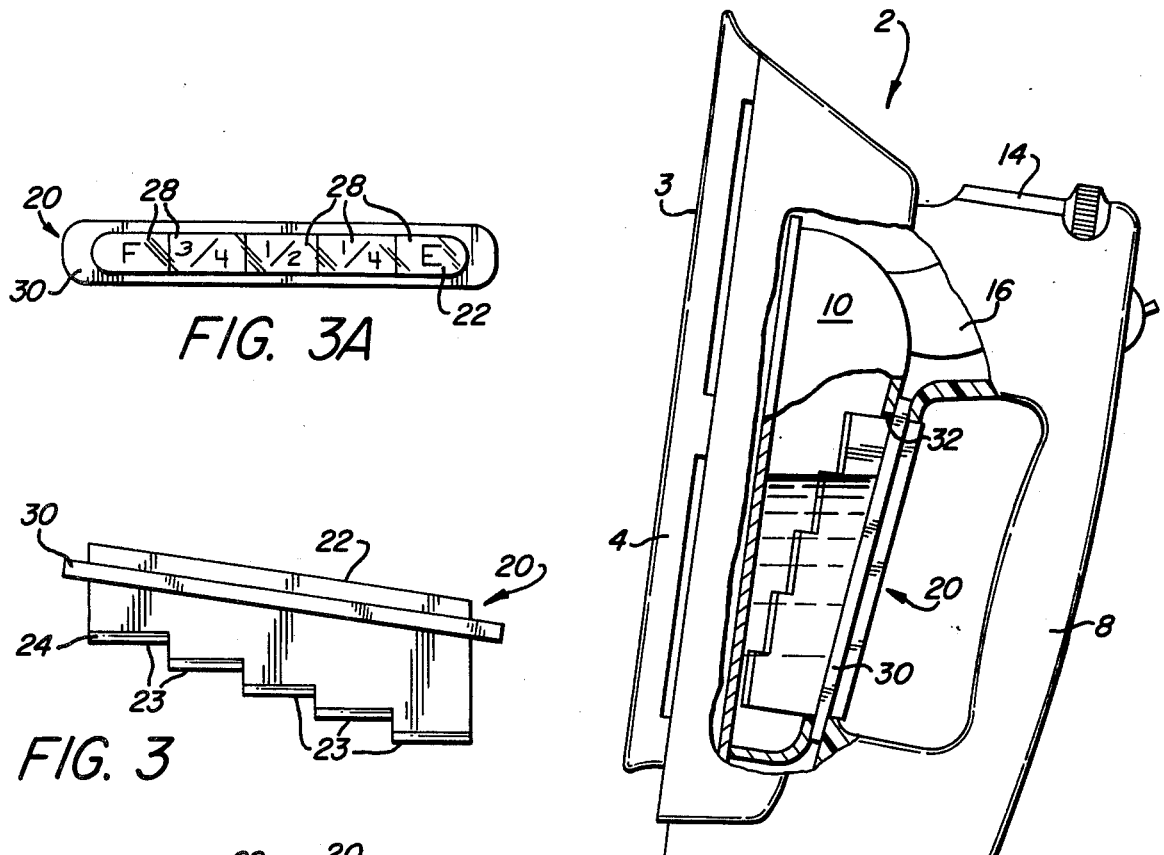
FIG. 2
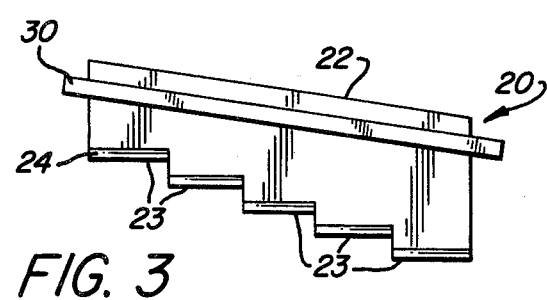
FIG. 3A
FIG. 3
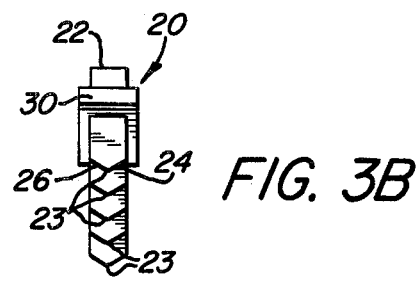
FIG. 3B

PRESSING IRON WATER LEVEL GAUGE

BACKGROUND OF THE INVENTION

It has been quite common in prior art to utilize a water gauge to indicate the water level in a steam iron reservoir and a stepped prismatic water level indicator has been utilized for this purpose. These previous water gauges, however, have been operable when the iron is in the horizontal or operating position or when the iron is in the heel rest position. These gauges have not been designed to be operable when the iron is in both of these positions.

SUMMARY OF THE INVENTION

The present invention is directed to a water level gauge which is orientated with respect to an iron and the water reservoir thereof so as to provide an exterior indication of the amount of water within the reservoir when the iron is in a multiplicity of orientations, primarily a horizontal or functioning position and a vertical or heel rest position. Preferably, the gauge is of the stepped prismatic type and the body of the stepped prismatic gauge extends into the water reservoir. Each step of the gauge is positioned with respect to the reservoir and the contents thereof so as to provide the same volumetric reading regardless of whether the iron is resting on its soleplate or its heel rest.

BRIEF DESCRIPTION OF THE DRAWINGS

The invention, together with its construction and method of operation, along with other objects and advantages thereof, is illustrated more or less diagrammatically in the drawings in which;

FIG. 1 is a side elevational view partially in cross-section showing the iron in the heel rest position, FIG. 2 is a side elevational view partially in cross-section showing the iron in the heel rest position, FIG. 3 is a side elevational view of the water gauge, FIG. 3a is a top planned view of the water gauge, and FIG. 3b is an end elevational view of the water gauge.

BRIEF DESCRIPTION OF THE PREFERRED EMBODIMENT

FIGS. 1 and 2 teach a steam iron 2 incorporating the preferred form of practicing the present invention. FIG. 1 teaches the iron 2 in its horizontal or normal operating position in which the iron rests on the pressing surface 3 of soleplate 4. FIG. 2 teaches the iron in a vertical or heel rest position in which the iron is supported on the rear planar surface 6 of the iron handle 8. The specific form of heel rest taught is only representative of many forms commonly in use. The iron 2 is representative of steam irons in general which contain a water reservoir which is designed to have more than one orientation, such as the horizontal position of FIG. 1 and the generally vertical position of FIG. 2. The specific details of construction of such particulars as the thermoplastic control, water valve control, heating means, steam generation and distribution do not form part of the present invention.

Such irons normally include the front fill opening such as at 14 which is connected to the water reservoir 10 by the means of a funnel 16. The fill opening 14 generally faces upwardly for filling when the iron is in either its vertical position, such as in FIG. 2, or when the iron is in its horizontal position, such as FIG. 1. The method of filling the reservoir in itself also does not form part of the present invention.

The invention is directed to the water gauge 20 and its positioning with respect to the water reservoir 10. The water gauge 20 in its preferred form is shown in detail in FIGS. 3, 3a, and 3b, and is of the stepped prismatic type. Prismatic liquid level gauges are quite old and utilize the principle of index of reflection. The material of the gauge may be glass, lucite or other transparent material. Light enters the gauge 20 through the top surface 22 and is directed downwardly to a plurality of steps 23 each having surfaces 24 and 26 both inclined at a 45° angle. If the surfaces 24 and 26 are immersed in liquid, the light will pass through the surfaces 24 and 26 and be disbursed into the liquid. However, if the inclined surfaces 24 and 26 are exposed to air, the light will bounce off inclined surface 24 to inclined surface 26 and then upwardly through top surface 22.

Therefore, if a plurality of steps 23 are utilized as in the gauge 20 of FIG. 3, the longer steps will be immersed for a given level of liquid and the light passing through these steps will be dispersed into the fluid. The area on top surface 22 above these steps will appear dark. The shorter steps not immersed in fluid will have the light reflected back to the top surface 22 which will appear light in these areas.

The top surface 22 of the gauge can be provided with indicia 28 which provide a reading for the level of water in the reservoir 10 since the indicia 28 above submerged steps will appear dark. The indicia 28 can indicate when the reservoir 10 is empty or full and as many steps in between as desired. An inclined slope having faces 24 and 26 could be utilized rather than the steps 23 of FIG. 3, but in practice it is found that the discrete steps provide clearer readings.

The gauge 20 is provided with a flange 30 which is utilized to mount the gauge 20 on the reservoir 10 after the steps 23 have been passed through a top opening 32 thereof. A sealant is utilized between the flange 30 and the top wall of the reservoir 10 to both seal the top opening 32 and also act as a thermal insulator between the reservoir 10 and the gauge 20. The depth of the steps 23 of the gauge 22 are, of course, quite important and the depth of each step 23 is designed to touch the upper surface of the water for a given water level when the reservoir 10 is in both the horizontal position of FIG. 1 and the vertical position of FIG. 2. This is true for each step 23 and, thus, the water gauge 22 will provide a given reading regardless of the inclination of the iron 2 and thus the inclination of the water reservoir 10. Since in most irons the cross-sectional area of the water tank from front to reat varies considerably, the steps 23 will generally not follow a constant slope but will progress so as to provide the same water level reading regardless of the orientation of the iron. Generally, the full water level reading will be at a level which does not represent the total volume of the reservoir 10 since it is desirable to prevent splashing of water from the reservoir 10 during fore and aft motion of the iron. Furthermore, the empty water level will generally be above a position when the reservoir 10 is dry since an extremely low water level will provide uneven or inconsistent flow through the iron water valve as the iron 2 is moved back and forth. The important advantage, however, is that both the full reading and the empty reading, or any reading therebetween, is provided to the user of the iron 2 regardless of the orientation of the iron. Thus, a reading can be obtained while the iron is being filled through opening 14, during the normal ironing operation when the iron is in a horizontal position, or when the iron is in the heel rest position, such as shown in FIG. 2. The user is thus always aware of the water level within the reservoir 10 and can thus act accordingly. This is obviously more advantageous than an iron water gauge which can only be read when the iron is in the horizontal position or when the iron is in the heel rest position.

In view of the foregoing, it will be apparent to those skilled in the art that I have accomplished at least the principal object of my invention and it will also be apparent to those skilled in the art that the embodiment herein described may be variously changed and modified without departing from the spirit of the invention, and that the invention is capable of uses and has advantages not herein specifically described, hence it will be appreciated that the hereindisclosed embodiment is illustrative only and that my invention is not limited thereto.

I claim:

1. In a pressing iron having a horizontal position wherein said iron is supported by its pressing surface and a vertical position wherein the pressing surface of said iron is in a generally vertical plane, and a water reservoir in said iron, the improvement comprising:

a water level gauge carried by said iron and cooperating with the upper surface of a variable quantity of water in said reservoir to indicate the quantity of water therein;

said gauge having a portion so located relative to the upper surface of the water in said reservoir that such variable upper water surface cooperates in the same manner with said gauge portion when said iron is in either of the aforesaid positions whereby the same level is indicated in either of said positions.

2. The iron of claim 1 wherein said iron has a heel rest for supporting said iron in said vertical position and said gauge has a first portion corresponding to a low water level reading positioned toward the end of said reservoir adjacent said heel rest and a second portion corresponding to a high water level reading positioned toward the end of said reservoir opposite said heel rest.

3. The iron of claim 2 wherein said water level gauge is of the prismatic type utilizing reflective incidence of light, said gauge having a plurality of reflective steps located within said reservoir, said first portion of said gauge being the step positioned nearest to said heel rest and said second portion being the step positioned farthest from said heel rest.

* * * * *